Oct. 23, 1928.
J. B. HECK, JR., ET AL
1,688,332
ANÆSTHETIZING
Filed June 27, 1927
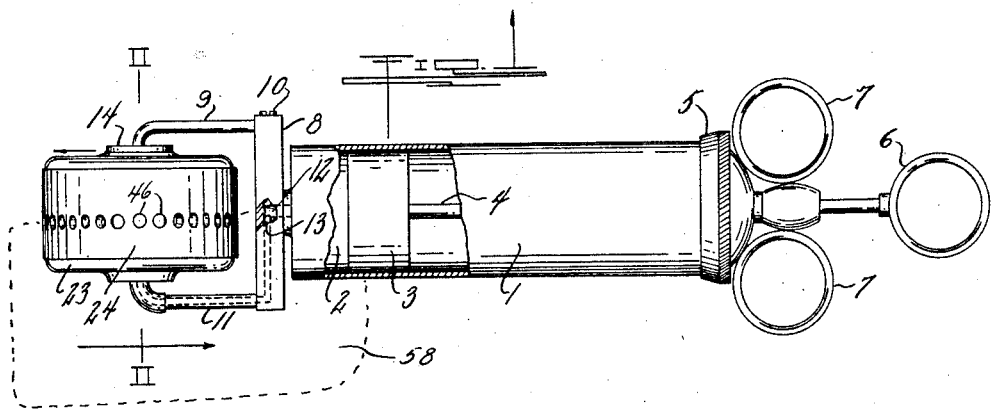
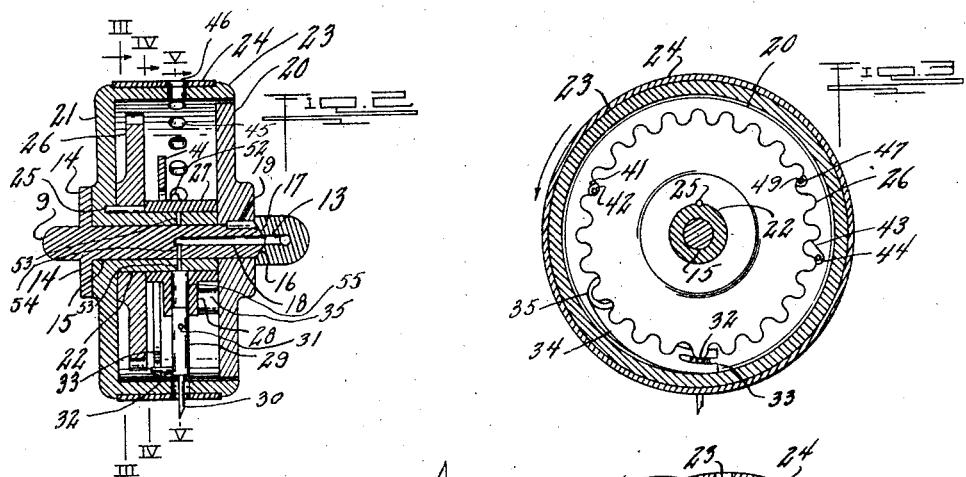
Inventors
John B. Heck, Jr.
Joseph J. Sweeney
By
Geo. Kirk
Attorney Patented Oct. 23, 1928.

1,688,332

UNITED STATES PATENT OFFICE.

JOHN B. HECK, JR., AND JOSEPH J. SWEENEY, OF TOLEDO, OHIO.

ANÆSTHETIZING.

Application filed June 27, 1927. Serial No. 201,583.

This invention relates to hypodermic administration.

This invention has utility when incorporated as a local anæsthetic blocking out operation.

Referring to the drawings:

Fig. 1 is a side elevation, with parts broken away, showing an embodiment of the invention in a hypodermic needle stitching director or operator;

Fig. 2 is a section on the line II—II, Fig. 1;

Fig. 3 is a section on the line III—III, Fig. 2, looking in the direction of the arrow;

Fig. 4 is a section on the line IV—IV, Fig. 2, looking in the direction of the arrow;

Fig. 5 is a section on the line V—V, Fig. 2, looking in the direction of the arrow;

Fig. 6 is a fragmentary view of the needle actuating device showing the needle in withdrawn position instead of projecting position as shown in Fig. 4; and Fig. 7 is a detail view of the rocking path of the direction of the needle in addition to its reciprocation.

Cylindrical handle 1 is shown as having chamber 2 upon which may act piston 3 as directed by piston rod 4 extending through charging cap 5 and operated by finger ring 6 for producing a head or pressure on anæsthetic in the chamber 2. Finger ring 7 fixed with the cap 5 and thus assembled with the handle 1 makes it convenient for the one operating this tool to have fingers in the ring 7 and thumb in the ring 6 for effecting a thrusting of the piston rod 4 for producing the pressure head on the anæsthetic in the chamber 2 by the handle 1.

This handle 1 is provided with cross head 8 having spring arm 9 detachably mounted therewith by screw 10. Rigid with this cross head 8 is arm 11 in parallelism with the arm 9. From the chamber 2 extends duct 12 by passage 13 into tubular arm 11. The arm 9 terminates in flange 14 from which extends axle 15 parallel to the head 8. This axle 15 terminates in seat 16 coacting with seat 17 in the tubular arm 11 for there registering duct 18 in the axle 15 with the duct in the tubular arm 11.

Key 19 serves to anchor disk 20 against rotation upon the axle 15, and thus maintains in assembly thereon roller having disk 21 adjacent the flange 14. This disk 21 has sleeve portion 22 as its bearing on the axle 15. This disk 21 carries rim portion 23 for the roller upon which is mounted tread 24 say of a friction characteristic, as rubber, in a material which may be readily sterilized.

Fixedly mounted with this roller of the disk 21 by key 25 is toothed wheel 26. Loosely mounted on the axle 22 between this toothed wheel 26 and the disk 20 is sleeve 27 carrying tubular arm 28 as a radially extending guide for plunger 29 having mounted therein hypodermic needle 30. This needle 30 is detachably anchored in the plunger 29 by pin 31.

The plunger 29 is provided with projecting pin 32 engaged by fork terminus 33 of arm 34 mounted on pin 35 fast with the disk 20. Fixed with the arm 34 is short arm 36 of this angle lever 34, 36. This arm 36 of the angle lever carries pin 37 operable in slot 38 of arm 39 mounted on bearing 40 also fixed with the disk 20. This arm 39 has branch arm 41 carrying roller 42 operating against the periphery of the toothed disk 26. Also fixed rigidly with the arms 39, 41, is arm 43 of identical length with the arm 41 from the mounting bearing 40.

This arm 43 carries roller 44 coacting with the longer radius portion or outer portion of a tooth of the disk 26 when the roller 42 of the arm 41 is in the root or the shorter radius portion of the toothed wheel 26. It is accordingly seen that as the roller 23 operates to turn the disk 21 while the disk 20 is held from rotation, that the rollers 42, 44, as oppositely riding upon the teeth of the disk 26, positively oscillate the angle lever 39, 41, 43 and likewise positively transmit to a multiplied extent through oscillation of the angle lever 34, 36, reciprocation to the plunger 29 for retracting and projecting in uniform sequence during roller rotation at needle 30 as to annular series of openings 45 in the rim 23 as registering with holes 46 in the tread 24.

Additionally mounted on the bearing 40 adjacent the angle lever 39, 41, 43, is angle lever 47, 48. The arm 47 carries roller 49 riding radially outward as the needle 30 is at its inner limit of travel. This means that this positive throw of the lever 47, 48, is effective through slot 50 in the arm 48 as engaging pin 51 in arm 52 of the sleeve 27 for rocking this sleeve 27 together with the plunger 29 and needle 30 in a recover direction toward an approaching rim opening 45. This means that as so directed, the needle 30 in the radial outward projection, may be thrust into the flesh of the individual undergoing treatment without any tearing action upon the flesh, for in the continuing travel of the roller, the lever 47, 48, allows this plunger and needle 30 to be guided by the flesh and thus move with the tread of the roller as long as the needle is projected therefrom. As the needle 30 is retracted into the roller clear of the rim opening 45, this lever 47, 48, is again effective for the step in advance.

Aligned with the openings 45 of the rim with slight following relationship are openings 53 in the axle 22 as rigid with the rim 23. As the sleeve 27 is rocked into the advance position, and thereafter as the lever arm 34 has acted to thrust the needle 30 into the flesh, then duct 18, as having radial branch 54, comes into registry with a radial duct 53 in the sleeve 27 for supplying a charge of anæsthetic under the head as created in the chamber 2 for flow into chamber 55 through the tubular plunger 29 and the tubular hypodermic needle 30 for discharge into flesh 56 of the patient at the interval of complete insertion and early portion of the withdrawing of the needle 30. This delivery is discontinued before the needle is clear of the flesh 56. Accordingly, it is seen that in the flesh 56 there is produced a series of openings 57 in blocking out an anæsthetic region 58 to be anæsthetized say for a minor surgical operation.

This tool is one which may be quickly manipulated for effective operation in the uniform stitching as to discharge of anæsthetic in a region of flesh. The tool is one which may be readily cleansed or rendered sterile and readily charged as a hypodermic syringe.

What is claimed and it is desired to secure by Letters Patent is:

1. A local anæsthetic administering tool comprising a handle, a traveling carrier movable as to the handle, a hypodermic needle positioned by the handle and as to which the carrier is movable, and actuating connections from the carrier for reciprocating the needle as to the carrier.

2. A local anæsthetic administering tool comprising a traveling carrier, a hypodermic needle as to which the carrier is movable, and actuating connections from the carrier for reciprocating the needle during carrier movement relatively to the needle.

3. A local anæsthetic administering tool comprising a traveling carrier, a hypodermic needle as to which the carrier is movable, and actuating connections from the carrier for providing anæsthetic supply to the needle during carrier movement relatively to the needle.

4. A local anæsthetic administering tool comprising a traveling carrier, a hypodermic needle, and control connections from the carrier for reciprocating the needle and synchronizing with such reciprocation anæsthetic supply to the needle.

5. A directing handle, a roller providing a way, a hypodermic needle, actuating connection from the roller for reciprocating the needle through said way, and a reset for directing the needle.

6. A directing handle having a reservoir for an anæsthetic, a roller providing a way, a hypodermic needle mounted within the roller, actuating connection from the roller for reciprocating the needle through said way, a reset for directing the needle, a duct from the reservoir controllably connectible on needle projection with the needle, and means for producing a head on the reservoir for promoting anæsthetic delivery to the needle.

In witness whereof we affix our signatures.

JOHN B. HECK, Jr.
JOSEPH J. SWEENEY.